(12) United States Patent
Gilliland et al.

(10) Patent No.: US 7,562,742 B2
(45) Date of Patent: Jul. 21, 2009

(54) AIR EXHAUST/INLET SOUND ATTENUATION MECHANISM

(75) Inventors: Don A. Gilliland, Rochester, MN (US); Cary M. Huettner, Rochester, MN (US); Matthew C. Zehrer, Saint Paul, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/139,156

(22) Filed: Jun. 13, 2008

(65) Prior Publication Data

US 2008/0245607 A1  Oct. 9, 2008

Related U.S. Application Data

(60) Provisional application No. 11/388,853, filed on Mar. 24, 2006.

(51) Int. Cl.
  *F01N 1/12* (2006.01)
  *H02K 5/24* (2006.01)
  *F01N 1/08* (2006.01)
  *H05K 7/20* (2006.01)

(52) U.S. Cl. .................. 181/280; 181/202; 181/279; 361/694

(58) Field of Classification Search ........... 181/280, 181/202, 201, 274, 279; 439/695; 454/184; 361/695, 694
See application file for complete search history.

(56) References Cited

U.S. PATENT DOCUMENTS

| | | | | |
|---|---|---|---|---|
| 772,279 A | * | 10/1904 | Sarvela ................ | 165/177 |
| 1,782,396 A | * | 11/1930 | Aaron .................. | 181/280 |
| 2,958,390 A | * | 11/1960 | Montague .............. | 181/255 |
| 3,235,003 A | * | 2/1966 | Smith .................. | 165/135 |
| 3,746,126 A | * | 7/1973 | de Cardenas .......... | 181/227 |
| 4,146,112 A | * | 3/1979 | Usry .................. | 181/202 |
| 4,264,282 A | * | 4/1981 | Crago ................. | 417/243 |
| 4,317,502 A | * | 3/1982 | Harris et al. .......... | 181/280 |
| 4,345,341 A | * | 8/1982 | Saito ................. | 4/301 |
| 4,533,015 A | * | 8/1985 | Kojima ................ | 181/280 |
| 4,574,913 A | * | 3/1986 | Fukuda ................ | 181/231 |
| 4,600,326 A | * | 7/1986 | Fudatsuji et al. ....... | 400/691 |
| 4,667,770 A | * | 5/1987 | DeVane ................ | 181/280 |
| 4,683,978 A | * | 8/1987 | Venter ................ | 181/280 |
| 4,733,750 A | * | 3/1988 | Poirier et al. ........ | 181/202 |
| 4,907,645 A | * | 3/1990 | Dumas et al. .......... | 165/41 |
| 5,184,104 A | * | 2/1993 | Kondo ................. | 336/100 |
| 5,443,371 A | * | 8/1995 | Calciolari ............ | 417/312 |
| 5,453,647 A | * | 9/1995 | Hedeen et al. ......... | 310/51 |
| 5,495,872 A | * | 3/1996 | Gallagher et al. ...... | 138/44 |
| 5,526,228 A | * | 6/1996 | Dickson et al. ........ | 361/695 |
| 5,606,297 A | * | 2/1997 | Phillips .............. | 333/141 |
| 6,459,579 B1 | * | 10/2002 | Farmer et al. ......... | 361/695 |
| 6,554,100 B2 | * | 4/2003 | Kim ................... | 181/279 |
| 6,654,242 B2 | * | 11/2003 | Ogawa ................. | 361/687 |

(Continued)

*Primary Examiner*—Edgardo San Martin
(74) *Attorney, Agent, or Firm*—Dillon & Yudell LLP

(57) ABSTRACT

An attenuation mechanism for an electronic device is presented. The attenuation mechanism includes an outer member that has an inner member oriented axially within the outer member. The inner member has an axial twist that causes a line of sight blockage between an exterior and an interior of a housing of an electronic device when the attenuation mechanism is mounted through the housing, such that sound and electromagnetic radiation is attenuated without obstructing cooling air that is flowing through the housing.

13 Claims, 5 Drawing Sheets

U.S. PATENT DOCUMENTS

| | | | |
|---|---|---|---|
| 6,807,986 B2 * | 10/2004 | Boger | 138/44 |
| 7,135,644 B1 * | 11/2006 | Gilliland et al. | 174/383 |
| 7,283,359 B2 * | 10/2007 | Bartell et al. | 361/695 |
| 7,303,048 B2 * | 12/2007 | Gallagher et al. | 181/296 |
| 7,310,243 B2 * | 12/2007 | Gilliland et al. | 361/818 |
| 7,314,113 B2 * | 1/2008 | Doll | 181/225 |
| 7,334,662 B1 * | 2/2008 | Anderl et al. | 181/200 |
| 2001/0050198 A1 * | 12/2001 | An et al. | 181/403 |
| 2005/0011700 A1 * | 1/2005 | Dadd | 181/279 |
| 2005/0263199 A1 * | 12/2005 | Meheen | 138/44 |
| 2007/0297159 A1 * | 12/2007 | Gilliland | 361/818 |

\* cited by examiner

AIR EXHAUST/INLET SOUND ATTENUATION MECHANISM

PRIORITY CLAIM

The present application is a continuation of U.S. patent application Ser. No. 11/388,853, filed on Mar. 24, 2006, entitled "Air Exhaust/Inlet Sound Attenuation Mechanism". Applicants claim benefit of priority under 35 U.S.C. §120 to U.S. patent application Ser. No. 11/388,853, which is incorporated by reference herein in its entirety and for all purposes.

BACKGROUND OF THE INVENTION

1. Technical Field

The present invention relates in general to the field of electronics, and in particular to housings for electronic equipment. More particularly, the present invention relates to a method and system for allowing cooling air to flow from a housing unimpeded while attenuating the level of sound and electromagnetic radiation that emanates from the housing.

2. Description of the Related Art

Computer housing designers are faced with a dilemma. Most computers need to be cooled by internal fans, which are noisy. At the same time, most computers generate electromagnetic noise (interference) from their internal clocks, busses, power supplies, etc. While cooling is critical for computers, it is also important to minimize the amount of inherent noise and electromagnetic radiation that escapes from the housing. That is, while optimal cooling might be achieved if the computer had no enclosed housing, this would be noisy and prevent ElectroMagnetic Compatibility (EMC), due to the amount of electromagnetic noise that would emanate from the computer. Conversely, if the housing were a solid box, then there would be no cooling air flow outside the housing, which would ultimately result in a heat-induced failure of the computer. What is needed, therefore, is a mechanism that permits unimpeded air flow to pass through the housing, while keeping sound and electromagnetic noise contained within the housing.

SUMMARY OF THE INVENTION

The present invention is therefore directed to an attenuation mechanism for an electronic device. The attenuation mechanism includes an outer member that has an inner member oriented axially within the outer member. The inner member has an axial twist that causes a line of sight blockage between an exterior and an interior of a housing of an electronic device when the attenuation mechanism is mounted through the housing, such that sound and electromagnetic radiation is attenuated without obstructing cooling air that is flowing through the housing.

The above, as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further purposes and advantages thereof, will best be understood by reference to the following detailed description of an illustrative embodiment when read in conjunction with the accompanying drawings, where:

DETAILED DESCRIPTION OF A PREFERRED EMBODIMENT

Figure 1A:
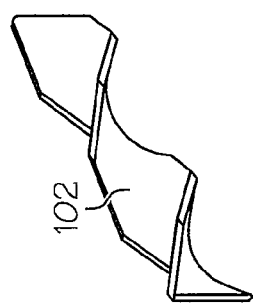
FIGS. 1a-d depicts various views of an inner member of an attenuation mechanism.
Figure 1B:
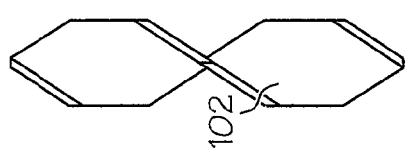
Figure 1C:
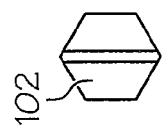
Figure 1D:
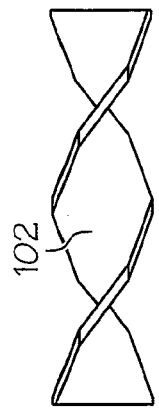

With reference now to the figures, and in particular to FIGS. 1a-d, a 360 inner member 102 is depicted in an isometric view (FIG. 1a), a top view (FIG. 1b), a front view (FIG. 1c), and a side view (FIG. 1d). Note that 360 inner member 102 makes a complete axial twist of 360° from one end to an opposite end. Note also that, as best shown in FIGS. 1c-d, 360 inner member 102 is twisted such that flat edges of the twisted 360 inner member 102 are aligned to facilitate flush mating against interior surfaces of an outer member 202, as depicted and described below. In one embodiment, 360 inner member 102 is made of a sound dampening material and/or an electromagnetic attenuating material, whose purposes will be described below.

Figure 2B:
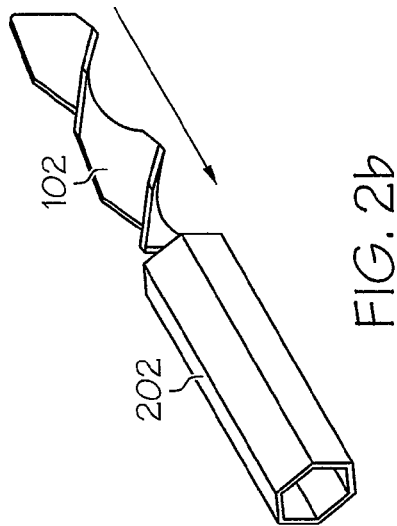
FIG. 2b depicts an assembly of a 360° twisted inner member into the outer member to form the attenuation mechanism.
Figure 2C:
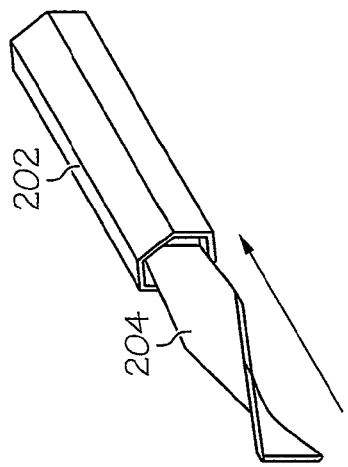
FIG. 2c illustrates an assembly of a 180° twisted inner member into the outer member to form the attenuation mechanism.
Figure 2A:
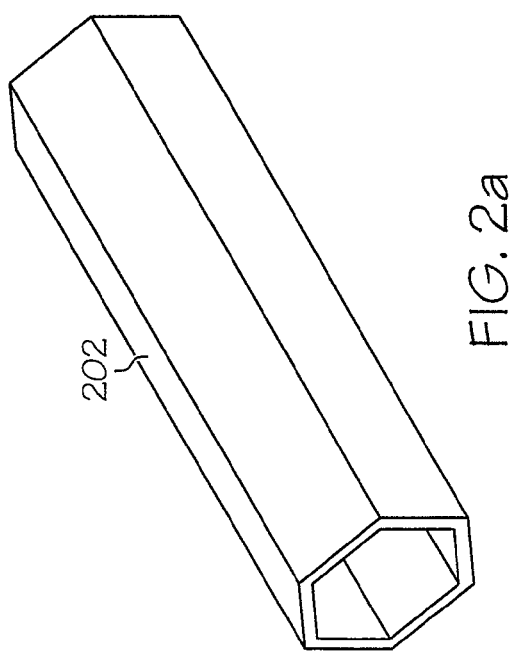
FIG. 2a illustrates an outer member of the attenuation mechanism.
Figure 3B:
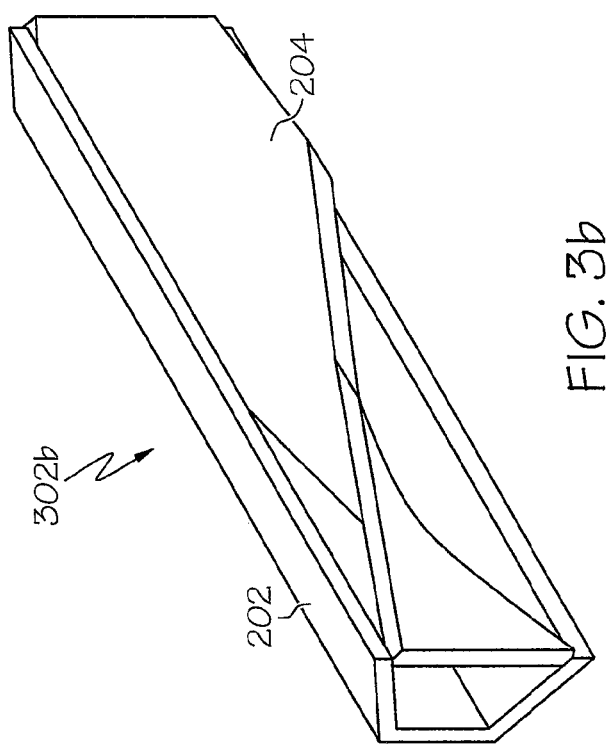
FIGS. 3a-b show cutaway views of assembled attenuation mechanisms.
Figure 3A:
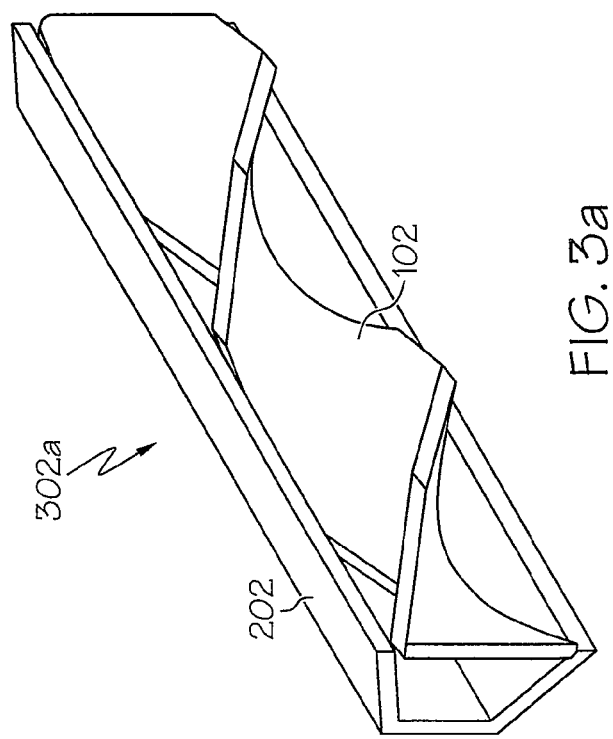

With reference to FIG. 2a, an outer member 202 is depicted as having a hexagonal cross section. As shown in FIG. 2b, 360 inner member 102 is fully inserted into outer member 202 to create an attenuation mechanism 302a, shown in further detail below in FIG. 3a. In another embodiment, the inner member that is inserted into outer member 202 to create an attenuation mechanism 302b (shown in FIG. 3b below) is a 180 inner member 204, as shown in FIG. 2c. As shown in FIGS. 3a-b, the flat edges of the inner members mate flush against flat interior surfaces of the hexagonal shaped outer member 202.

As further shown in the cutaway view of attenuation mechanisms 302a-b shown in FIGS. 3a-b, the inner members that are axially oriented within outer member 202 cause a line of sight blockage from one interior end of the outer member 202 to another interior end. Thus, when the attenuation mechanism 302 is mounted in a housing, line of sight blockage is achieved between an interior and an exterior of the housing. However, air flow through the attenuation mechanism 302 is still unobstructed, allowing for an unimpeded flow of cooling air between an interior and an exterior of the housing. In one embodiment, the inner member and/or outer member is constructed of a material that absorbs electromagnetic radiation, such that electromagnetic radiation leakage from the interior of the housing is attenuated. Alternatively and/or additionally, the inner member and/or outer member are constructed of material that absorbs sound, such that sound leakage from the interior of the housing is attenuated.

Figure 4:
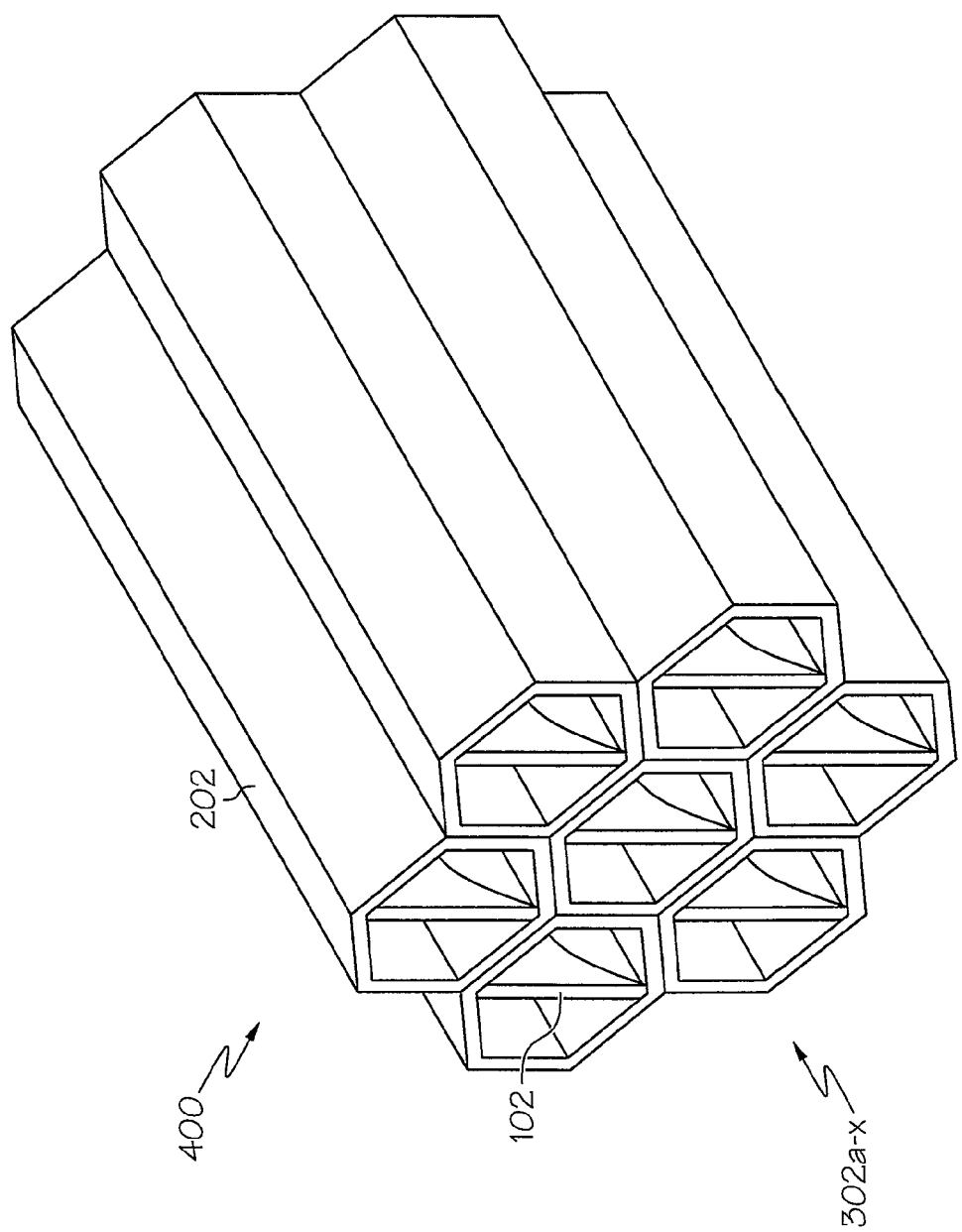
FIG. 4 illustrates a multi-unit assembly composed of multiple attenuation mechanisms.

Referring now to FIG. 4, a multi-unit assembly 400, composed of multiple attenuation mechanisms 302a-x, is illustrated. Multi-unit assembly 400 permits improved and additional air flow due to the increased cross-sectional areas for air to pass across. Note that each inner member 102 locks into the interior cross-section, which is preferably hexagonal, of outer member 202. Note also that while inner members 102 are depicted inside each outer member 202, inner members 204 lock into the interior of the outer members 202 in a like manner if inner members 204 are used. In addition, while inner members are shown locked into the interior of outer members 202 that are part of the multi-unit assembly 400, similar locking occurs between any type of inner member (102 or 204) and the interior of an outer member 202 when part of a single unit attenuation mechanism 302. Finally, note that the hexagonal exterior surfaces of the attenuation mechanisms 302a-x permit them to mate together in a manner that prevents noise and/or electromagnetic radiation from leaking through spaces that otherwise would be created between adjacent attenuation mechanisms 302.

Figure 5:
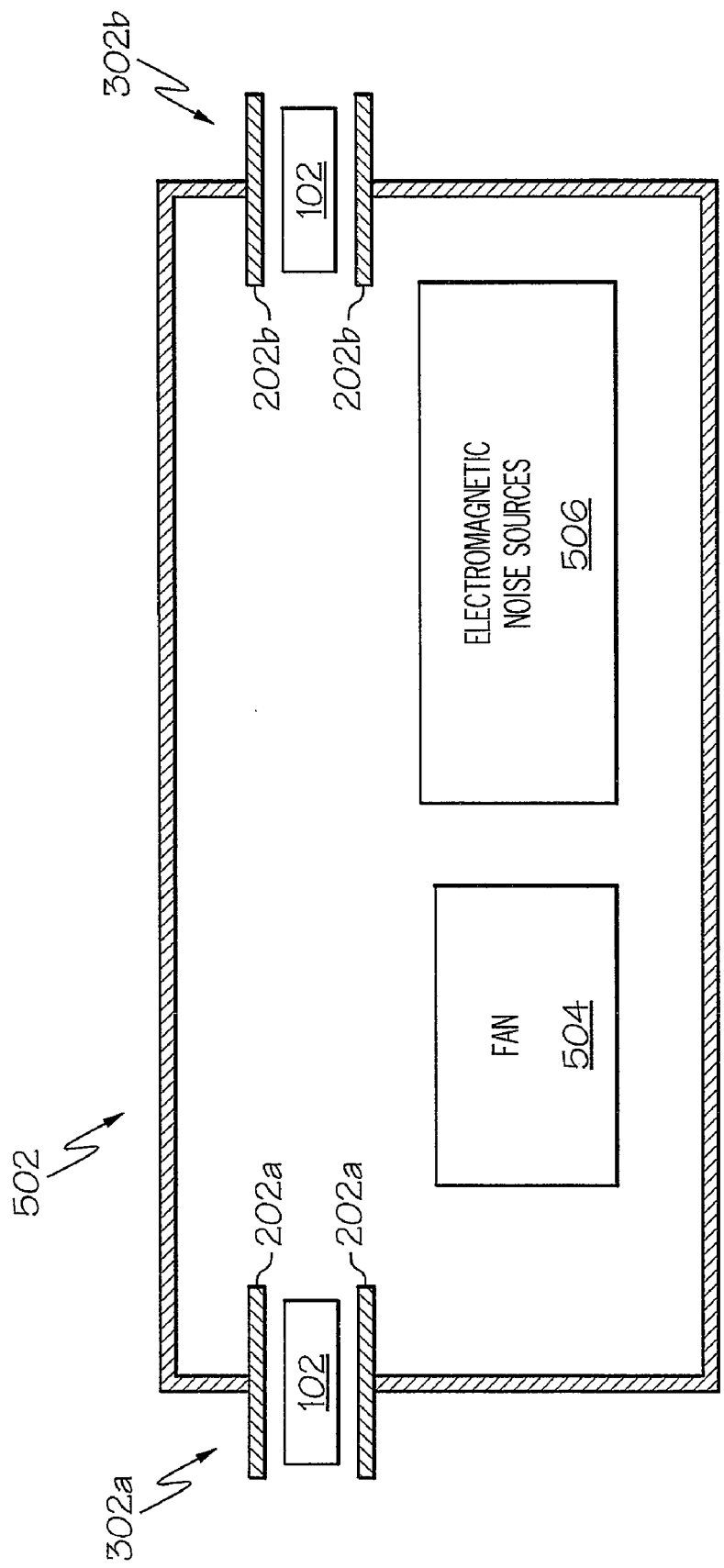
FIG. 5 shows the multi-unit assembly installed in a housing of an electronic device.

With reference now to FIG. 5, a housing 502 is depicted. Housing 502 may be for any device in which noise and/or other attenuation is needed while permitting unimpeded air flow through the housing. Such devices include, but are not limited to, electronic devices, including computers. Note that within housing 502 is a fan 504, which needs an inlet and an outlet for air through housing 502. These inlets and outlets are provided by the installation of one or more attenuation mechanisms 302, which may be single attenuation mechanisms 302 and/or multi-unit assemblies 400. However, because inner members, such as 360 inner member 102 and/or 180 inner member 204, do not provide a line of sight between an interior and an exterior of housing 502, sound is baffled (attenuated) without impeding air flow through the attenuation mechanisms 302.

Note also that within housing 502 are electromagnetic noise sources 506, which may be any electronic device that generates extraneous electromagnetic noise, including but not limited to busses, internal clocks, integrated circuits chips, power supplies, wiring, etc. The axially twisted nature of the inner members (either 360 inner member 102 or 180 inner member 204) mechanically attenuated some of the electronic noise. However, maximum electromagnetic attenuation is achieved if the inner member and/or the outer member are made of a material that absorbs such electromagnetic noise.

Note that the inner member (102 or 204) and outer member 202 of each attenuation mechanism 302 may be of different colors, in order to accentuate the presence of the inner member, and thus providing a visual cue that the line-of-sight into the interior of the housing 502 has been deliberately blocked (but not the flow of air, as discussed above).

Note also that the optimal amount of axial twisting of an inner member is less than 360°, such that resistance to air flow is minimized. As depicted, when axially twisted as shown in the figures, the flat edges of the inner members mate flush against the interior surfaces of the hexagonal outer member 202, thus providing a secure and snug mating fit. Thus, the preferred twisting of 180° or 360° is not arbitrary, but rather is designed to provide this novel mating.

While the invention has been particularly shown and described with reference to a preferred embodiment, it will be understood by those skilled in the art that various changes in form and detail may be made therein without departing from the spirit and scope of the invention.

What is claimed is:

1. An attenuation mechanism for an electronic device, the attenuation mechanism comprising:
   an outer member having a hexagonal interior cross-section, wherein multiple outer members are oriented side-by-side to form a multi-unit assembly, wherein each outer member of the multi-unit assembly has a hexagonal exterior surface such that at least one planar exterior surface of a hexagonal exterior surface of a first outer member is mated with an adjacent planar exterior surface of a second outer member such that there are no spaces between adjacent outer members, said lack of spaces preventing leakage of noise and electromagnetic radiation from the housing; and
   an inner member having flat edges and oriented axially within the outer member, wherein the inner member has an axial twist that causes a line of sight blockage between an exterior and an interior of a housing of an electronic device, wherein the flat edges of the inner member mate flush against flat interior surfaces of the outer member, and wherein the inner member locks into the hexagonal interior cross-section.

2. The attenuation mechanism of claim 1, wherein the inner member has a 360° axial twist.

3. The attenuation mechanism of claim 1, wherein the inner member has a 180° axial twist.

4. The attenuation mechanism of claim 1, wherein the inner member is composed of a material that attenuates electromagnetic radiation leakage from the housing of the electronic device.

5. The attenuation mechanism of claim 1, wherein the inner member is composed of a material that attenuates sound.

6. The attenuation mechanism of claim 1, wherein the inner member causes air to flow between the interior and exterior of the housing of the electronic device in an unobstructed corkscrew pathway within the outer member.

7. The attenuation mechanism of claim 1, wherein the inner and outer members are of different colors to accentuate a presence of the inner member inside the outer member.

8. An electronic device comprising:
   a housing, wherein the housing includes:
      at least one air passage between an exterior of the housing and an interior of the housing, wherein each air passage includes:
         an outer member having a hexagonal interior cross-section, wherein multiple outer members are oriented side-by-side to form a multi-unit assembly, wherein each outer member of the multi-unit assembly has a hexagonal exterior surface such that at least one planar exterior surface of a hexagonal exterior surface of a first outer member is mated with an adjacent planar exterior surface of a second outer member such that there are no spaces between adjacent outer members, said lack of spaces preventing leakage of noise and electromagnetic radiation from the housing; and
         an inner member having flat edges and oriented axially within the outer member, wherein the inner member has an axial twist that causes a line of sight blockage between the exterior and the interior of the housing, wherein the flat edges of the inner member mate flush against flat interior surfaces of the outer member, and wherein the inner member locks into the hexagonal interior cross-section.

9. The electronic device of claim 8, wherein the inner member has a 360° axial twist.

10. The electronic device of claim 8, wherein the inner member has a 180° axial twist.

11. The electronic device of claim 8, wherein the inner member is composed of a material that attenuates electromagnetic radiation leakage from the housing of the electronic device.

12. The electronic device of claim 8, wherein the inner member causes air to flow between the interior and exterior of the housing of the electronic device in an unobstructed corkscrew pathway within the outer member.

13. The electronic device of claim 8, wherein the inner and outer members are of different colors to accentuate a presence of the inner member inside the outer member.

* * * * *